US008635657B2

(12) United States Patent
Badam et al.

(10) Patent No.: US 8,635,657 B2
(45) Date of Patent: Jan. 21, 2014

(54) AUTHENTICATED BROADCAST TRANSMISSION UTILIZING A CONTENT RETRANSMITTER

(75) Inventors: Ravikumar Badam, Raichur (IN); Janarthanan Natarajan, Puducherry (IN); Gurubasappa Kore, Bangalore (IN)

(73) Assignee: Sling Media PVT LTD, Bangalore (IN)

( * ) Notice: Subject to any disclaimer, the term of this patent is extended or adjusted under 35 U.S.C. 154(b) by 335 days.

(21) Appl. No.: 12/907,734

(22) Filed: Oct. 19, 2010

(65) Prior Publication Data
US 2012/0096483 A1    Apr. 19, 2012

(51) Int. Cl.
*H04N 7/173*    (2011.01)

(52) U.S. Cl.
USPC .............................. 725/98; 725/30; 709/219

(58) Field of Classification Search
USPC .............................. 725/86–120; 709/217–232
See application file for complete search history.

(56) References Cited

U.S. PATENT DOCUMENTS

| 5,884,031 | A  | * | 3/1999 | Ice .................................. 709/203 |
| 5,956,716 | A  | * | 9/1999 | Kenner et al. .......................... 1/1 |
| 6,145,084 | A  | * | 11/2000 | Zuili et al. ............................. 726/3 |
| 6,211,901 | B1 | * | 4/2001 | Imajima et al. ................... 725/93 |
| 6,502,125 | B1 | * | 12/2002 | Kenner et al. ................... 709/203 |
| 6,671,731 | B1 |   | 12/2003 | Cain |
| 6,947,473 | B1 | * | 9/2005 | Rademacher ................... 375/148 |
| 7,330,966 | B2 | * | 2/2008 | Ice et al. ............................. 713/2 |
| 2002/0154892 | A1 | * | 10/2002 | Hoshen et al. ................... 386/87 |
| 2005/0172309 | A1 | * | 8/2005 | Risan et al. ........................ 725/1 |
| 2006/0256959 | A1 |   | 11/2006 | Hymes |
| 2007/0124779 | A1 |   | 5/2007 | Casey et al. |
| 2007/0157237 | A1 |   | 7/2007 | Cordray et al. |
| 2007/0204161 | A1 |   | 8/2007 | Isozaki et al. |
| 2007/0220553 | A1 |   | 9/2007 | Branam et al. |
| 2010/0141749 | A1 |   | 6/2010 | Murakmi |

FOREIGN PATENT DOCUMENTS

| EP | 1494375 A2 | 1/2005 |
| WO | 2005122025 A2 | 12/2005 |

OTHER PUBLICATIONS

European Patent Office "International Search Report and Written Opinion" mailed Feb. 17, 2012 for International Appln. No. PCT/IN2011/000713, filed Oct. 17, 2011.

* cited by examiner

*Primary Examiner* — Annan Shang
(74) *Attorney, Agent, or Firm* — Ingrassia Fisher & Lorenz, P.C.

(57) ABSTRACT

A content retransmitter receives information for receivers and forms an authorized list by transmitting authentication prompts, receiving authentication information, and adding receivers if the authentication information for the respective receiver is verified to match stored user information. Subsequently, the content retransmitter may receive content and broadcast the received content to some or all of the receivers on the authorized list. Additionally, the content retransmitter may store the received content in a storage medium and provide the stored content to receivers on the authorized list upon request. The user authentication information received from the receivers may be passwords, biometric information, and so on. The received content may be broadcast to a subset of the authorized list corresponding to users who are related to the content. The related users may be determined by examining metadata about the received content, facial recognition analysis of users present in the received content, and so on.

19 Claims, 2 Drawing Sheets

AUTHENTICATED BROADCAST TRANSMISSION UTILIZING A CONTENT RETRANSMITTER

FIELD OF THE INVENTION

This disclosure relates generally to content retransmission, and more specifically to authenticated broadcasting of content utilizing a content retransmitter.

SUMMARY

The present disclosure discloses systems and methods for authenticated broadcast transmission utilizing a content retransmitter. The content retransmitter receives information for multiple broadcast receivers and forms a list of authorized broadcast receivers by transmitting authentication prompts, receiving user authentication information, and adding broadcast receivers if the received user authentication information for the respective broadcast receiver is verified to match stored user information. Subsequently, the content retransmitter may receive content and may broadcast the received content to some or all of the broadcast receivers on the authorized broadcast receiver list. The content that is broadcast may be encrypted utilizing encryption information determined for each specific broadcast receiver.

Additionally, the content retransmitter may store the received content in a storage medium and provide the stored content to broadcast receivers on the authorized broadcast receiver list upon request. The content retransmitter may store the received content in a storage medium of the content retransmitter, transmit the received content to an associated programming receiver for storage, and so on.

In various implementations, the user authentication information received from the broadcast receivers may be passwords. In other implementations, the user authentication information received from the broadcast receivers may be biometric information such as fingerprints and/or palm prints, retinal scans, images of users, and so on.

In some implementations, the broadcast receivers to which the received content is broadcast may be a subset of the authorized broadcast receiver list associated with users who have a relationship to the content. In such implementations, the content retransmitter may identify users who are related to the content, such as by examining metadata about the received content, facial recognition analysis of users present in the received content, and so on. After identifying users who are related to the content, the content retransmitter may broadcast the received content to broadcast receivers on the authorized broadcast receiver list that correspond to the identified users.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
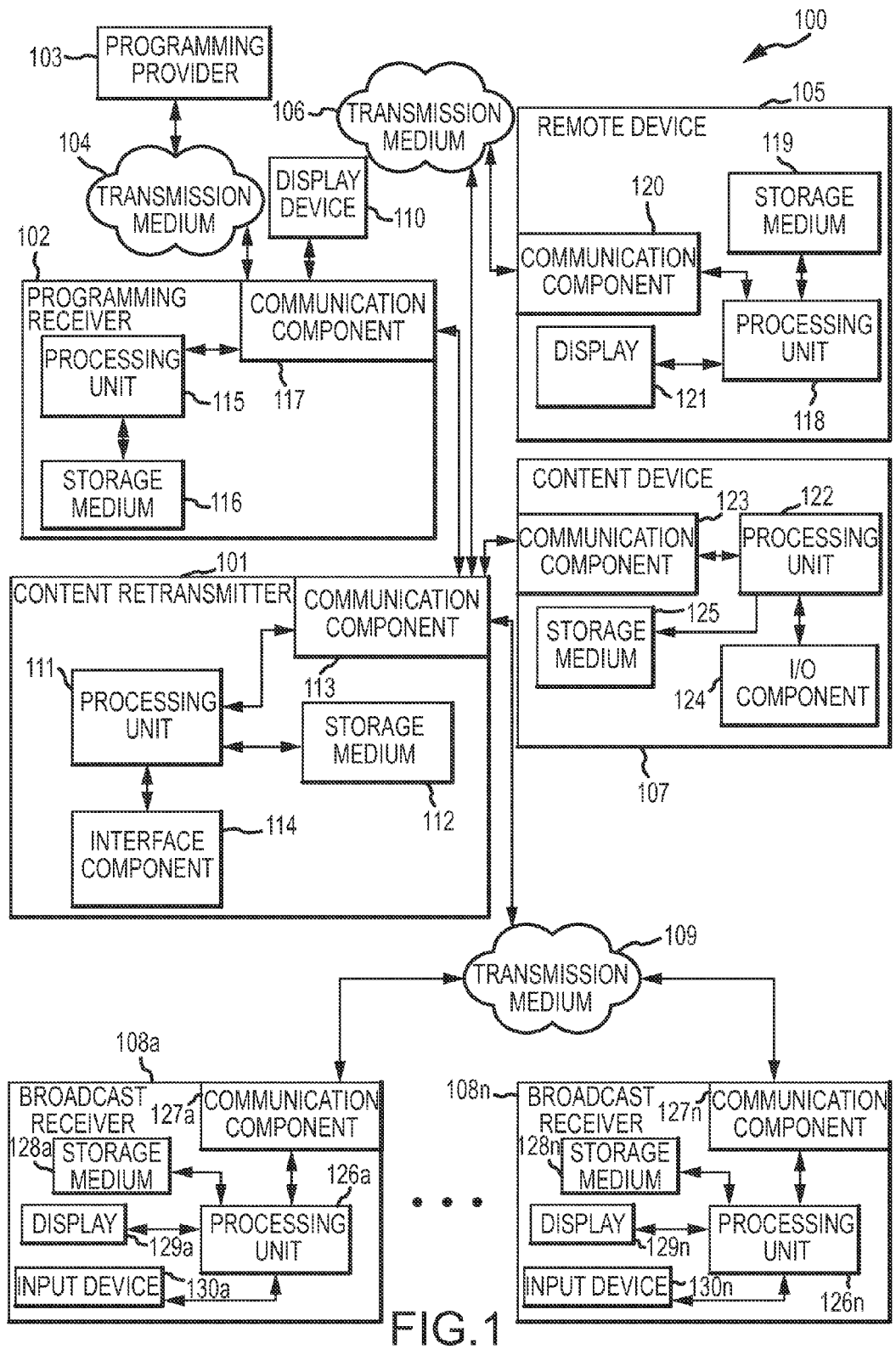
FIG. 1 is a block diagram illustrating a system for authenticated broadcast transmission utilizing a content retransmitter.

The description that follows includes sample systems, methods, and computer program products that embody various elements of the present disclosure. However, it should be understood that the described disclosure may be practiced in a variety of forms in addition to those described herein.

Content retransmitters, such as Slingbox® marketed by Sling Media®, typically receive programming content (such as one or more television programs, movies, and so on) from a programming receiver (such as a set top box, a cable box, a digital video recorder, and so on) and retransmit the programming content in a unicast fashion to an associated computing device (such as a laptop computing device, a tablet computer device, a cellular telephone, and so on). The programming content received from the programming receiver is generally obtained by the programming receiver from a programming content provider, such as a cable television provider, a satellite television provider, an on-demand movie provider, an Internet service provider, and so on. The owner of the programming receiver and content retransmitter may then use a player application on the associated computing device to connect to the content retransmitter and view the programming content, essentially enabling viewing of the programming content remote from the programming receiver.

A user may wish to use a content retransmitter to share content of their own in addition to remotely viewing programming content of his programming receiver. For example, the user may want to broadcast video of himself taken as part of a video messaging system, family pictures stored on his digital camera, and so on to multiple people. However, as the user is sharing the content with other users instead of accessing content remotely himself, the user may have difficulty controlling who receives the broadcasted content. The user may only want certain people to receive the broadcasted content. Because devices that may receive content retransmitted in such a situation by the content retransmitter could be used by different people, people the user does not intend may receive the broadcasted content. As a result of such concerns, users may be unwilling to share content utilizing content retransmitters.

The present disclosure discloses systems and methods for authenticated broadcast transmission utilizing a content retransmitter. The content retransmitter receives information for multiple broadcast receivers (devices to receive broadcasts of retransmitted content). The information may include a network address (such as an internet protocol address) and a user for each of the broadcast receivers. The content retransmitter may then form a list of authorized broadcast receivers. To form such a list, the content retransmitter may transmit an authentication prompt to each of the broadcast receivers, receive user authentication information in response, and add each of the broadcast receivers to the authorized broadcast receiver list only if the content retransmitter verifies the user for that broadcast receiver by comparing the received user authentication information with stored information for that user. Thus, not only are the devices to which broadcasts will be made authorized, the users of those devices are authorized as well.

The content retransmitter may also determine encryption information for the broadcast receivers on the authorized broadcast receiver list. Subsequently, the content retransmitter may receive content to broadcast. The content retransmitter may retransmit, or broadcast, the received content to some or all of the broadcast receivers on the authorized broadcast receiver list. The broadcast receivers to which the received content is broadcast may be a subset of the authorized broadcast receiver list associated with users who have a relationship to the content. The content that is broadcast to each of the broadcast receivers may be encrypted utilizing the encryption information determined for that broadcast receiver. Thus, the content may be broadcast to the particular people intended by the user of the content retransmitter.

FIG. 1 is a block diagram illustrating a system 100 for authenticated broadcast transmission utilizing a content retransmitter. The system 100 includes a content retransmitter 101, one or more content devices 107, and a number of broadcast receivers 108a-108n communicably coupled to the content retransmitter 101 via one or more transmission media 109 (which may include any kind of wired or wireless transmission media such as a satellite connection, an Internet connection, a cellular connection, a local area network connection, and so on).

The content retransmitter 101 may include one or more processing units 111, one or more storage media 112 (which may be any non-transitory machine-readable storage media), one or more communication components 113, and one or more interface components 114. The content device 107 may include one or more processing units 122, one or more storage media 125 (which may be any non-transitory machine-readable storage media), one or more communication components 123, and one or more input/output components 124. Each of the broadcast receivers 108a-108n may include one or more processing units 126a-126n, one or more storage media 128a-128n (which may be any non-transitory machine-readable storage media), one or more communication components 127a-127n, one or more input devices 129a-129n, and one or more displays 130a-130n.

The processing unit 111 of the content retransmitter 101 may execute instructions stored in the storage medium 112 in order to receive information for the broadcast receivers 108a-108n from a user via the interface component 114. The information may include a network address (such as an internet protocol address) and a user for each of the broadcast receivers. The processing unit may then execute instructions stored in the storage medium to form a list of authorized broadcast receivers by transmitting an authentication prompt to the network address of each of the broadcast receivers utilizing the communication component 113, receiving user authentication information from each of the broadcast receivers utilizing the communication component, and adding each of the broadcast receivers to the authorized broadcast receiver list only if the user for that broadcast receiver can be verified by comparing the received user authentication information with stored information for that user. The stored information for the users may be stored in the storage medium. Alternatively, the processing unit may retrieve the stored information from a remote database (not shown) utilizing the communication component.

The processing unit 111 may also determine encryption information for the broadcast receivers 108a-108n that are on the authorized broadcast receiver list. The processing unit may determine the encryption information by communicating with the broadcast receivers via the communication component 113 to request and receive an encryption key for the respective broadcast receiver, transmit individual respective decryption keys to the individual broadcast receivers, exchange individual respective encryption and decryption keys with the broadcast receivers, and so on.

After the processing unit 111 creates the authorized broadcast receiver list, the content retransmitter 101 may receive content from the content device 107 via the communication component 113. The content may be any kind of content such as one or more images, videos, data files, and so on and the content device may be any device that provides content to the content retransmitter, such as a video camera, a video phone, a digital camera, a cell phone, a desktop computer, a laptop computer, a mobile computer, a video game system, and so on. The content retransmitter may broadcast the received content to some or all of the broadcast receivers 108a-108n on the authorized broadcast receiver list and may encrypt the received content that is broadcast to the broadcast receivers utilizing the respective encryption information.

In some implementations, the content retransmitter 101 may broadcast the received content to all of the broadcast receivers 108a-108n on the authorized broadcast receiver list. In other implementations, the content retransmitter may identify users who are related to the content and may broadcast the received content to the broadcast receivers 108a-108n on the authorized broadcast receiver list that correspond to the identified related users. The content retransmitter may identify users who are related to the content by analyzing the received content, metadata about the received content and so on.

By way of a first example, the received content may include metadata detailing users who are related to the received content. As such, the content retransmitter may analyze the metadata and broadcast the received content to broadcast transmitters that correspond to the users detailed in the metadata. By way of a second example, the received content may be analyzed utilizing facial recognition technologies to identify one or more users who are present in the received content. The content retransmitter may perform the facial recognition. Alternatively, the content retransmitter may transmit the content to a facial recognition service device (not shown) and receive identified users from the facial recognition service device via the communication component 113. Then, the content retransmitter may broadcast the received content to broadcast transmitters that correspond to the users identified by facial recognition as present in the received content.

Each of the broadcast receivers 108a-108n to which the content is broadcast may then receive the broadcast content via the respective communication component 127a-127n. The broadcast receivers may then utilize the respective processing unit 126a-126n to execute instructions stored in the respective storage medium 128a-128n to play the received broadcast content on the respective display 129a-129n. If the received broadcast content is encrypted, the respective processing unit may first execute instructions stored in the respective storage medium to decrypt the received broadcast content before playing the decrypted content on the respective display.

In some implementations, the user authentication information may be a password. In such implementations, when the respective broadcast receiver 108a-108n receives the authentication prompt from the content retransmitter 101 via the respective communication component 127a-127n, the respective processing unit 126a-126n may execute instructions stored in the respective storage medium 128a-128n to present an authentication prompt screen on the respective display 129a-129n. In this case the input device 130a-130n may be a keyboard, keypad, touchscreen, or other input device suitable for a user of the respective broadcast receiver to utilize to enter a password. The password entered by the user of the respective broadcast receiver may then be transmitted to the content retransmitter via the respective communication component and compared against stored password information to verify the user.

In other implementations, the user authentication information may be biometric information such as one or more user fingerprints, one or more user retinal scans, one or more user pictures, and so on. In such implementations, when the respective broadcast receiver 108a-108n receives the authentication prompt from the content retransmitter 101 via the respective communication component 127a-127n, the respective processing unit 126a-126n may execute instructions stored in the respective storage medium 128a-128n to present an authentication prompt screen on the respective display 129a-129n. In this case the input device 130a-130n may be a fingerprint scanner, retinal scanner, camera, or other biometric input device configured to record the appropriate biometric information for the user of the respective broadcast receiver. The biometric information captured by the respective input device may then be transmitted to the content retransmitter via the respective communication component and compared against stored biometric information to verify the user.

Figure 2:
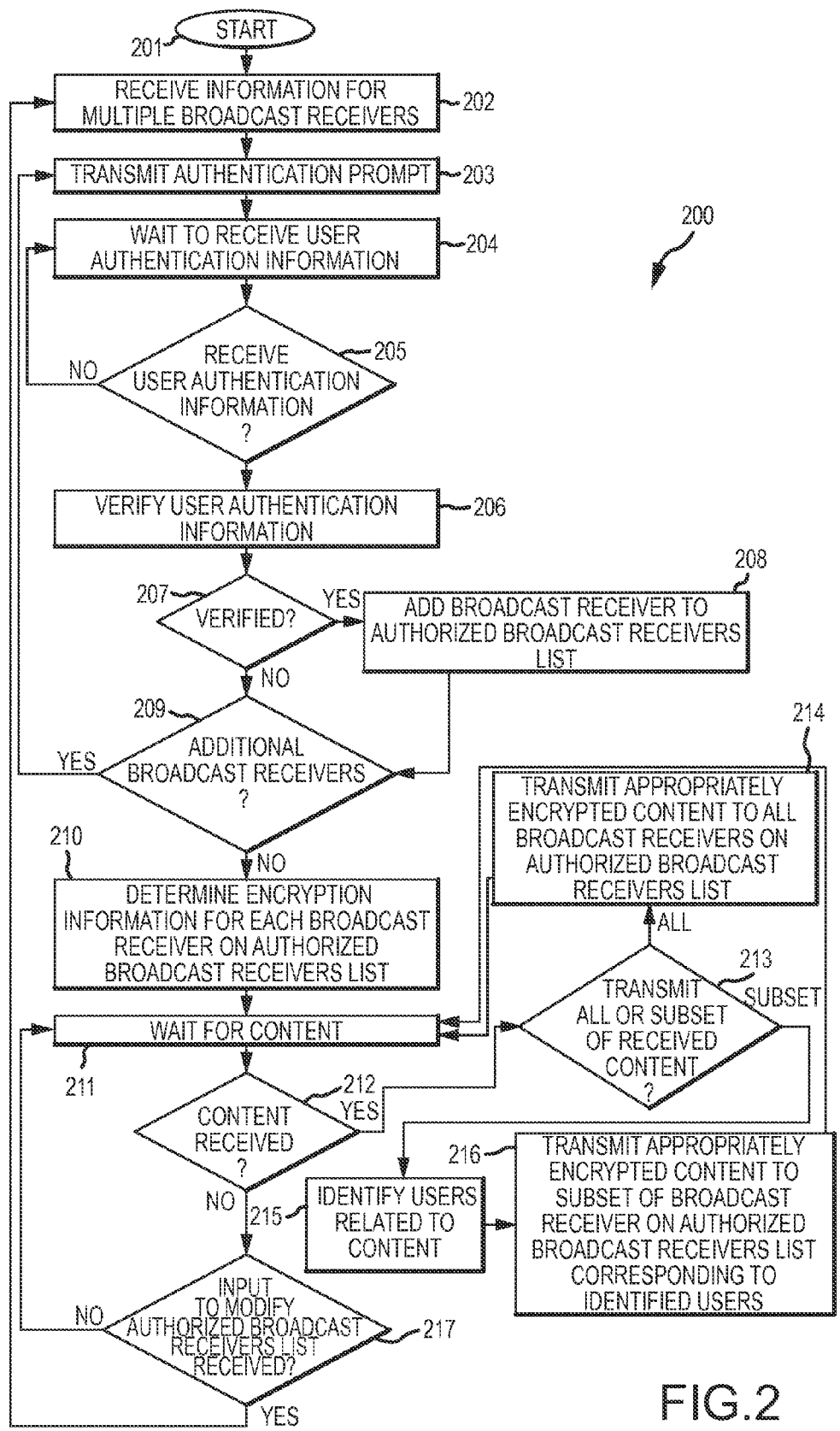
FIG. 2 is a flow chart illustrating a method for authenticated broadcast transmission utilizing a content retransmitter. This method may be performed by the system of FIG. 1.

FIG. 2 illustrates a method 200 for authenticated broadcast transmission utilizing a content retransmitter. The method 200 may be performed by the content retransmitter 101 of FIG. 1. The flow begins at block 201 and proceeds to block 202 where the content retransmitter receives information for multiple broadcast receivers 108a-108n. The information may be received from a user and may include at least a network address and a user of a broadcast receiver. The flow then proceeds to block 203 where the content retransmitter transmits an authentication prompt to a broadcast receiver based on the information. The flow then proceeds to block 204 where the content receiver waits to receive user authentication information in response to the authentication prompt. The flow then proceeds to block 205 where the content receiver determines whether or not the user authentication information has been received. If so, the flow proceeds to block 206. Otherwise, the flow returns to block 204 where the content retransmitter continues to wait for the user authentication information to be received.

At block 207, the content retransmitter 101 determines whether or not the user is verified by comparing the received user authentication information against stored information. The user authentication information may be a password, biometric information, and so on. If the user is verified, the flow proceeds to block 208 where the content retransmitter adds the broadcast receiver to the authorized broadcast receiver list before the flow proceeds to block 209. Otherwise, the flow proceeds to 209 where the content retransmitter determines whether or not additional broadcast receivers remain to be authenticated.

At block 209, if additional broadcast receivers remain to be authenticated, the flow returns to block 203 where the content retransmitter 101 transmits an authentication prompt to a broadcast receiver based on the information received from the user. Otherwise, the flow proceeds to block 210 where the content retransmitter determines encryption information for each of the broadcast receivers on the authorized broadcast receiver list. The content retransmitter may add the determined encryption information to the entry for the respective broadcast receiver on the authorized broadcast receiver list. The flow then proceeds to block 211 where the content receiver waits to receive content to broadcast.

The flow then proceeds to block 212 where the content retransmitter 101 determines whether or not content to broadcast has been received. If so, the flow proceeds to block 213. Otherwise, the flow proceeds to block 217.

At block 213, after the content retransmitter 101 determines content to broadcast has been received, the content retransmitter determines whether the content is to be broadcast to some or all of the broadcast receivers on the authorized broadcast receiver list. Content may be broadcast to some instead of all broadcast receivers on the authorized broadcast receiver list in some implementations when the content retransmitter determines that the users corresponding to some of the broadcast receivers on the authorized broadcast receiver list are related to the content. Users may be related to the content if they appear in the content, if metadata describing the content mentions the users, and so on.

If the content is to be broadcast to some, the flow proceeds to block 215. Otherwise, the flow proceeds to block 214 where the content retransmitter broadcasts the content to all of the broadcast receivers on the authorized broadcast receiver list. The content broadcast to each of the broadcast receivers may be encrypted utilizing the appropriate encryption information for the respective broadcast receiver. The flow then returns to block 211 where the content retransmitter waits to receive content to broadcast.

At block 215, after the content retransmitter 101 determines that the content is to be broadcast to some of the broadcast receivers on the authorized broadcast receiver list, the content retransmitter determines the users of the broadcast receivers on the authorized broadcast receiver list who are related to the content. The content retransmitter may determine the users who are related to the content by examining metadata that describes the content, analyzing the content using facial recognition technology to identify users, transmitting the content to a facial recognition service via the communication component 113 and receiving identified users present in the content from the facial recognition service, and so on. The flow then proceeds to block 216 the content retransmitter broadcasts the content to the broadcast receivers on the authorized broadcast receiver list that correspond to the related users. The content broadcast to each of the broadcast receivers corresponding to the related users may be encrypted utilizing the appropriate encryption information for the respective broadcast receiver. The flow then returns to block 211 where the content retransmitter waits to receive content to broadcast.

At block 217, after the content retransmitter 101 determines content to broadcast has not been received, the content retransmitter determines whether input to modify the authorized broadcast receiver list has been received. If so, the flow returns to block 202 where the content retransmitter receives information for broadcast receivers. Otherwise, the flow returns to block 211 where the content retransmitter waits to receive content to broadcast.

Returning to FIG. 1, the system 100 may also include one or more programming receivers 102 which are communicably coupled to the content retransmitter 101 via the communication component 113. The programming receiver may be any kind of programming receiver such as a set top box, a cable box, a television receiver, a digital video recorder, a cellular telephone, a laptop computer, a desktop computer, a mobile computer, and so on. The programming receiver may include one or more processing units 115, one or more storage media 116 (which may be any non-transitory machine-readable storage media), and one or more communication components 117. The programming receiver may be operable to receive programming content (such as one or more television programs, movies, video on demand programs, an so on) from one or more programming providers 103 (such as one or more satellite television providers, cable television providers, Internet service providers, video on demand providers, and so on) via one or more transmission media 104 (such as one or more satellite communication links, coaxial cable transmission links, cellular communication links, Internet communication links, an so on) and the communication component 117. The processing unit of the programming receiver may execute instructions stored in the storage medium to in order to store the received programming content in the storage medium, display the received programming content on an associated display device 110, and so on.

Additionally, the programming receiver 102 may also provide the received programming content to the content retransmitter 101. The system 100 may include a remote device 120 and the content retransmitter may retransmit the received programming content to the remote device via a transmission media 106 and the communication component 113 utilizing unicast transmission. The remote device may be any kind of computing device such as a laptop computer, a desktop computer, a mobile computer, a cellular telephone and so on. The remote device may include one or more processing units 118, one or more storage media 119 (which may be any non-transitory machine-readable storage media), one or more communication components 110, and one or more displays 121. The processing unit of the remote device may be operable to execute instructions stored in the storage medium of the remote device to receive retransmitted programming content from the content retransmitter via the communication component and play the retransmitted programming content on the display.

In addition to broadcasting the received content to some or all of the broadcast receivers 108*a*-108*n* on the authorized broadcast receiver list, the content retransmitter 101 may store the content received from the content device 107 in one or more storage media. Subsequently, the content retransmitter may provide the stored content to one or more of the broadcast receivers on the authorized broadcast receiver list upon receiving a request from that broadcast receiver. The storage media may be the storage medium 112 of the content retransmitter. Alternatively, the content retransmitter may transmit the content to the programming receiver 102 for storage in the storage medium 116.

By way of a first illustration of the system 100 performing the method 200, the content device 107 and the broadcast receivers 108*a*-108*n* may be participants in a video messaging service. In this illustration, the content device may be a cellular telephone with an integrated video camera and the broadcast receivers may be a group of laptop computers, desktop computers, mobile computers, cellular telephones, and so on. A user may transmit addresses and users of the broadcast receivers who are participants of a video message conference to the content retransmitter 101. The content retransmitter may form an authorized broadcast receiver list by transmitting an authorization prompt to each of the addresses, receiving user authentication information in response to the prompts, and adding the broadcast receiver that correspond to a particular address when the user authentication information matches stored user information. Subsequently, the user may record a video message as part of the video message conference utilizing the content device. The content device may transmit the video message to the content retransmitter and the content retransmitter may broadcast the video content to all of the broadcast receivers on the authorized broadcast receiver list.

By way of a second illustration of an second of the system 100 performing the method 200, the content device 107 may be a user's digital camera and the broadcast receivers 108*a*-108*n* may be computing devices belonging to people whom the user may wish to share picture with. However, the user may only wish to share pictures taken with the digital camera with users who are present in the pictures. The user may transmit addresses and users of the computing devices to the content retransmitter 101. The content retransmitter may form an authorized broadcast receiver list by transmitting an authorization prompt to each of the addresses, receiving user authentication information in response to the prompts, and adding the computing device that corresponds to a particular address when the user authentication information matches stored user information.

Subsequently, the user may provide pictures taken with the digital camera to the content retransmitter. The content retransmitter may identify users present in the pictures. If the user has entered metadata detailing users present in the pictures utilizing the digital camera, the content retransmitter may identify the users present in the pictures utilizing the metadata. Alternatively, the content retransmitter may analyze the pictures utilizing facial recognition technology to identify users in the pictures. Once the content retransmitter has identified users in the pictures, the content retransmitter may broadcast the pictures to the broadcast receivers on the authorized broadcast receiver list associated with the identified users.

For instance, the user may provide pictures taken of his wife and children with the digital camera to the content retransmitter. The user may have entered metadata for the pictures utilizing the digital camera specifying that his wife and children are present in the pictures. Computing devices associated with the user's wife and children may be present on the authorized broadcast receiver list. Hence, when the user provides the pictures to the content retransmitter via the digital camera, the content retransmitter may analyze the metadata to identify that the user's wife and children are present in the pictures and broadcast the pictures to their corresponding computing devices.

Although the transmission media 104, 106, and 109 are illustrated and described as separate transmission media, it should be understood that in various implementations the various transmission media may be implemented as a single transmission media connecting the various components in the system 100 and/or any number of configurations of one or more transmission media.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a: magnetic storage medium (e.g., floppy diskette, video cassette, and so on); optical storage medium (e.g., CD-ROM); magneto-optical storage medium; read only memory (ROM);

random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method for authenticated broadcast transmission utilizing a content retransmitter, the method comprising:
   receiving information for multiple broadcast receivers from a user at a content retransmitter, wherein the information includes at least a network address and a user for each of the multiple broadcast receivers, wherein the content retransmitter is operable to retransmit programming received from a programming receiver to an associated device;
   forming an authorized broadcast receiver list, utilizing the content retransmitter, by:
      transmitting an authentication prompt from the content retransmitter to each of the multiple broadcast receivers;
      receiving user authentication information at the content retransmitter from each of the multiple broadcast receivers; and
      adding each of the multiple broadcast receivers to the authorized broadcast receiver list after verifying the user for each of the multiple broadcast receivers by comparing the user authentication information received from the respective broadcast receiver with stored user information;
   requesting and receiving a respective encryption key from each of the multiple broadcast receivers on the authorized broadcast receiver list;
   receiving content at the content retransmitter;
   encrypting the received content using the respective encryption key from each of the multiple broadcast receivers, resulting in encrypted content; and
   broadcasting the encrypted content from the content retransmitter to a plurality of the multiple broadcast receivers on the authorized broadcast receiver list.

2. The method of claim 1, further comprising:
   storing the received content in at least one storage medium; and
   providing the stored content to any of the multiple broadcast receivers on the authorized broadcast receiver list upon request.

3. The method of claim 1, wherein the received content comprises video received from a video messaging system device.

4. The method of claim 1, wherein the user authentication information received from that broadcast receiver comprises at least one of a password or biometric information of a current user recorded by the respective broadcast receiver.

5. The method of claim 4, wherein the biometric information comprises at least one of at least one fingerprint of the current user, at least one retinal scan of the current user, or at least one image of the current user.

6. The method of claim 1, further comprising:
   determining a plurality of people related to the received content utilizing the content retransmitter; and
   generating a subset of the authorized broadcast receiver list utilizing the content retransmitter by including each of the multiple broadcast receivers on the authorized broadcast receiver list where the user of the respective broadcast receiver matches one of the plurality of people;
   wherein said operation of broadcasting the received content to a plurality of the multiple broadcast receivers on the authorized broadcast receiver list further comprises broadcasting the received content to the subset of the authorized broadcast receiver list.

7. The method of claim 6, wherein said operation of determining a plurality of people related to the received content utilizing the content retransmitter further comprises analyzing at least one of the received content or metadata about the received content.

8. The method of claim 7, wherein said operation of analyzing at least one of the received content or metadata about the received content further comprises identifying at least one of the plurality of people in the received content utilizing facial recognition.

9. The method of claim 8, wherein said operation of identifying at least one of the plurality of people in the received content utilizing facial recognition further comprises:
   transmitting at least a portion of the received content to a facial recognition service device; and
   receiving identification information from the facial recognition service device.

10. A system for authenticated broadcast transmission utilizing a content retransmitter, comprising:
    multiple broadcast receivers; and
    a content retransmitter, operable to retransmit programming received from a programming receiver to an associated device, comprising:
       at least one user interface component that receives information for the multiple broadcast receivers from a user, wherein the information includes at least a network address and a user for each of the multiple broadcast receivers;
       at least one communication component operable to receive content and communicate with the multiple broadcast receivers; and
       at least one processing unit that:
          generates an authorized broadcast receiver list;
          requests and receives a respective encryption key from each of the multiple broadcast receivers on the authorized broadcast receiver list;
          encrypts the received content using the respective encryption key from each of the multiple broadcast receivers, resulting in encrypted content; and
          broadcasts the encrypted content to a plurality of the multiple broadcast receivers on the authorized broadcast receiver list utilizing the at least one communication component;

wherein the at least one processing unit generates the authorized broadcast receiver list by transmitting an authentication prompt to each of the multiple broadcast receivers utilizing the at least one communication component, receives user authentication information from each of the multiple broadcast receivers utilizing the at least one communication component, and adds each of the multiple broadcast receivers to the authorized broadcast receiver list after verifying the user for each of the multiple content receivers by comparing the user authentication information received from the respective broadcast receiver with stored user information.

11. The system of claim 10, wherein the at least one processing unit determines a plurality of people related to the received content, generates a subset of the authorized broadcast receiver list by including each of the multiple broadcast receivers on the authorized broadcast receiver list where the user of the respective broadcast receiver matches one of the plurality of people, and broadcasts the received content to the plurality of the multiple broadcast receivers on the authorized broadcast receiver list utilizing the at least one communication component by broadcasting the received content to the subset.

12. The system of claim 11, wherein the at least one processing unit determines the plurality of people related to the received content by analyzing at least one of the received content or metadata about the received content.

13. The system of claim 12, wherein the at least one processing unit analyzes the received content by identifying at least one of the plurality of people in the received content using facial recognition.

14. The system of claim 13, wherein the at least one processing unit identifies the at least one of the plurality of people in the received content using facial recognition by transmitting at least a portion of the received content to a facial recognition service server and receiving identification information from the facial recognition service server via the at least one communication component.

15. The system of claim 10, further comprising a video messaging device wherein the received content comprises video content and the at least one communication component receives the content from the video messaging device.

16. The system of claim 10, wherein the user authentication information comprises at least one of a password of a current user or biometric information of the current user and each of the multiple broadcast receivers includes an input device operable to receive at least one of the password or the biometric information from the current user.

17. The system of claim 16, wherein the biometric information comprises at least one of at least one fingerprint of the current user, at least one retinal scan of the current user, or at least one image of the current user.

18. The system of claim 10, wherein the at least one processing unit stores the received content in at least one storage medium and is operable to provide the stored content to any of the multiple broadcast receivers on the authorized broadcast receiver list upon receiving a request via the at least one communication component.

19. The system of claim 18, wherein the at least one storage medium is included in the programming receiver and the at least one processing unit stores the received content in the at least one storage medium by transmitting the received content to the programming receiver.

* * * * *